(12) United States Patent
Kawamura

(10) Patent No.: US 7,130,123 B2
(45) Date of Patent: Oct. 31, 2006

(54) POLARIZATION CONVERSION ELEMENT AND OPTICAL SYSTEM CONTAINING SUCH POLARIZATION CONVERSION ELEMENT

(75) Inventor: Yoshiji Kawamura, Tochigi (JP)

(73) Assignee: Fujinon Sano Corporation, Sano (JP)

( * ) Notice: Subject to any disclaimer, the term of this patent is extended or adjusted under 35 U.S.C. 154(b) by 33 days.

(21) Appl. No.: 11/011,046

(22) Filed: Dec. 15, 2004

(65) Prior Publication Data

US 2005/0207020 A1 Sep. 22, 2005

(30) Foreign Application Priority Data

Dec. 16, 2003 (JP) .............................. 2003-418295

(51) Int. Cl.
*G02B 5/30* (2006.01)
*G02B 27/28* (2006.01)
*G03B 21/14* (2006.01)

(52) U.S. Cl. ...................... 359/501; 359/352; 359/497; 353/20

(58) Field of Classification Search ................. 359/501
See application file for complete search history.

(56) References Cited

U.S. PATENT DOCUMENTS

| | | | | |
|---|---|---|---|---|
| 5,231,521 A | * | 7/1993 | Johnson et al. | ............... 349/18 |
| 5,469,279 A | * | 11/1995 | Sharp et al. | .................. 349/74 |
| 6,384,956 B1 | * | 5/2002 | Shieh | ......................... 359/256 |

* cited by examiner

*Primary Examiner*—Arnel C. Lavarias
*Assistant Examiner*—Aline D McNaull
(74) *Attorney, Agent, or Firm*—Oblon, Spivak, McClelland, Maier & Neustadt, P.C.

(57) ABSTRACT

A polarization conversion element with four phase plates laminated on a substrate plate, in the order of first, second, third and fourth phase plates from a light incident side. The first and fourth phase plates have substantially same retardation values, while the second and third phase plate have substantially same retardation values. Ratio of the retardation value of the first phase plate to the retardation value of the second phase plate is in the range of 1:1 to 1:3. Relative to optical axis of the first phase plate, the second to fourth phase plates are set at the angles of 45 degrees, 90 degrees and 45 degrees, respectively.

7 Claims, 8 Drawing Sheets

POLARIZATION CONVERSION ELEMENT AND OPTICAL SYSTEM CONTAINING SUCH POLARIZATION CONVERSION ELEMENT

BACKGROUND OF THE INVENTION

1. Field of the Art

This invention relates to a polarization conversion element to be used on various optical appliances, and to an optical system containing such a polarization conversion element.

2. Prior Art

A beam splitter is used on various optical appliances as an optical element for splitting an incident light flux into two or more light paths. A certain type of beam splitter functions to split incident light into a number of light paths on the basis of diffraction of light, while another type of beam splitter functions to split incident light by transmission and reflection of light. An optical element which splits light by transmission and reflection of light is generally known as a half mirror. In this regard, half mirrors are not necessary made to split light equally into a number of light paths. Certain half mirrors are adapted to split light at an arbitrary ratio.

A half mirror is fabricated by laminating an optical film on a transparent material like optical glass. The laminating optical film can be a semi-transmitting type which is adapted to reflect incident light at a predetermined rate while transmitting the remainder, or a polarizing type which is adapted to reflect one of two polarized components with perpendicularly intersecting planes of polarization while transmitting the other component. Therefore, optical elements which are called "a half mirror" in a broad sense include a semi-transmitting film type and a polarizing film type which should be called "a half mirror" and "a polarizing beam splitter" in a narrow sense, respectively. In splitting incident light by reflection and transmission, the half mirror in the narrow sense can reflect and transmit light at an arbitrary ratio by controlling the transmission rate through the semi-transmitting film. On the other hand, of two polarized components with rectangularly intersecting planes of polarization, certain polarizing beam splitters are arranged to have such properties as to transmit one polarized component 100% while reflecting the other polarized component 100%. In this regard, it is possible to hold the transmission rate of one polarized component and the reflection rate of the other polarized component at a value less than 100%. The former can be classified as "complete beam splitter" and the latter can be classified as "incomplete beam splitter."

Polarized components of incident light, which is cast on a half mirror for splitting a light path, include linearly polarized light, circularly polarized light and elliptically polarized light. Even linearly polarized light may contain not only a component having a plane of polarization in perpendicularly intersecting relation relative to a certain plane of polarization but also components having a plane of polarization at an arbitrary angle relative to the certain plane of polarization. Further, elliptically polarized light includes a wide range of components from a component akin to circular polarization to a component of flat elliptic polarization which can be almost regard as linear polarization. Besides, the line of apsides lies in an arbitrary direction.

Gathering from the foregoing, normally a half mirror of the narrow sense is used as an optical element which transmits and reflect incident light in a controlled ratio. On the other hand, it has been the general practice to use a polarizing beam splitter particularly for splitting incident light having perpendicularly intersecting polarized components which are called p- and s-polarized components.

In the case of the half mirror, a beam splitter in a narrow sense, as a semi-transmitting film a metal film is laminated on a transparent member like optical glass. In order to control the transmission and reflection ratio, the metal film is formed by the use of metals such as silver (Ag), aluminum (Al), gold (Au) and chromium (Cr). Of these metals, silver and aluminum are low in wavelength dependency. That is to say, in order to split light of a broad wavelength range, it is necessary to use silver or aluminum. Comparing semi-transmitting films of the same transmission rate, it is preferable to employ a semi-transmitting film of silver rather than aluminum for the control of transmission rate, taking into account the effort which is required in making the aluminum film thinner. However, due to dependency on polarized components of incident light in addition to dependency on wavelength, it is difficult even for silver to split incident light strictly in a desired transmission and reflection ratio over a wide wavelength range. Above all, in the fields of optical pickups and other recently developed high precision optical devices like photo-computing devices, one faces difficulties in getting accurate light splitting characteristics by the use of a half mirror laminated with a silver semi-transmitting film.

In connection with a half mirror using a semi-transmitting film of silver, Japanese Laid-Open Patent Application 2001-13308 discloses a half mirror with a function of correcting variations in transmission-reflection ratio attributable to wavelength dependency and polarized components of incident light. According to this published patent literature, as a semi-transmitting film to be laminated on a half mirror (in a narrow sense), a metal film of silver is combined with a dielectric layer of low or medium refraction material and a dielectric layer of high refraction material to solve the problem of variations in transmission-reflection ratio due to wavelength dependency and polarized components.

Further, silver is problematic in weather resistance, namely, characteristics of a silver semi-transmitting film changes over a long period of time, with progress of corrosion which occurs under the influence of temperature and humidity. Besides, if incident light is of a wide range in wavelength, it may become difficult in some cases to prevent marked variations in transmission-reflection ratio and to guarantee sufficient reliability. In the case of the half mirror of the above-mentioned published patent literature, three films of different materials, i.e., a metal film and two dielectric films, have to be formed to stabilize the transmission-reflection ratio. In addition, considering the necessity for laminating a protective film layer on the metal film for the improvement of the weather resistance, it is likely that the fabrication process will become difficult and result in an expensive optical element.

Polarizing beam splitters, i.e., another type of half mirror in a broad sense, are stabilized in optical characteristics because no metallic films are used as optical films, and can maintain a predetermined transmission-reflection ratio accurately over a wide wavelength range by providing a suitable number of polarizing films of an adequate thickness. However, it is difficult to split incident light in a desired ratio without controlling polarized components in the incident light flux.

In splitting incident light in a controlled ratio, optical characteristics of the above-mentioned polarizing beam splitters do not necessarily require that the incident light be composed of two perpendicularly intersecting linearly polarized components. Namely, according to optical characteristics of polarizing beam splitters, it is possible to accurately control the transmission-reflection ratio for two perpendicularly intersecting polarized components of the same energy profile even if the two components are not linearly polarized in a strict sense. That is, in case two perpendicularly intersecting components of incident light on a polarizing beam splitter are of the same energy profile, the polarizing beam splitter can split the incident light substantially in the same way as incident light consisting of two perpendicularly intersecting linearly polarized components. Accordingly, if it becomes possible for a polarizing beam splitter to convert incident light into perpendicularly intersecting polarized components with the same energy profiles in an initiatory or introductory stage, the polarizing beam splitter can find a wide range of applications because it is reliable in weather resistance and stable in optical characteristics as a light splitting means.

SUMMARY OF THE INVENTION

In view of the foregoing situations, it is an object of the present invention to provide an optical element which can produce substantially perpendicularly intersecting polarized components in a volume ratio of 1:1, from incident light in the form of linearly or pseudo-linearly polarized light with an arbitrary plane of polarization.

The polarization conversion element according to the present invention employs four phase plates with predetermined retardation values and azimuth settings to output two perpendicularly intersecting polarized components in a volume ratio of 1:1, by conversion of incident light in the form of linearly or pseudo-linearly polarized light.

More specifically, in a preferred form of the present invention, the polarization conversion element comprises: four laminated phase plates, in the order of first, second, third and fourth phase plates from a light incident side; the first and fourth phase plates having substantially the same retardation value while the second and third phase plates having substantially the same retardation value; a ratio of a retardation value of the first phase plate to a retardation value of the second phase plate being in the range of 1:1 to 1:3; and relative to an optical axis of the first phase plate, the second to fourth phase plates being set at angles of 45 degrees, 90 degrees and 45 degrees, respectively.

The above and other objects, features and advantages of the present invention will become apparent from the following particular description of the invention, taken in conjunction with the accompanying drawings which show by way of example preferred embodiments of the invention. Needless to say, the present invention is not restricted to particular forms shown in the drawings.

BRIEF DESCRIPTION OF THE DRAWINGS

In the accompanying drawings.

DESCRIPTION OF PREFERRED EMBODIMENTS

Figure 1:
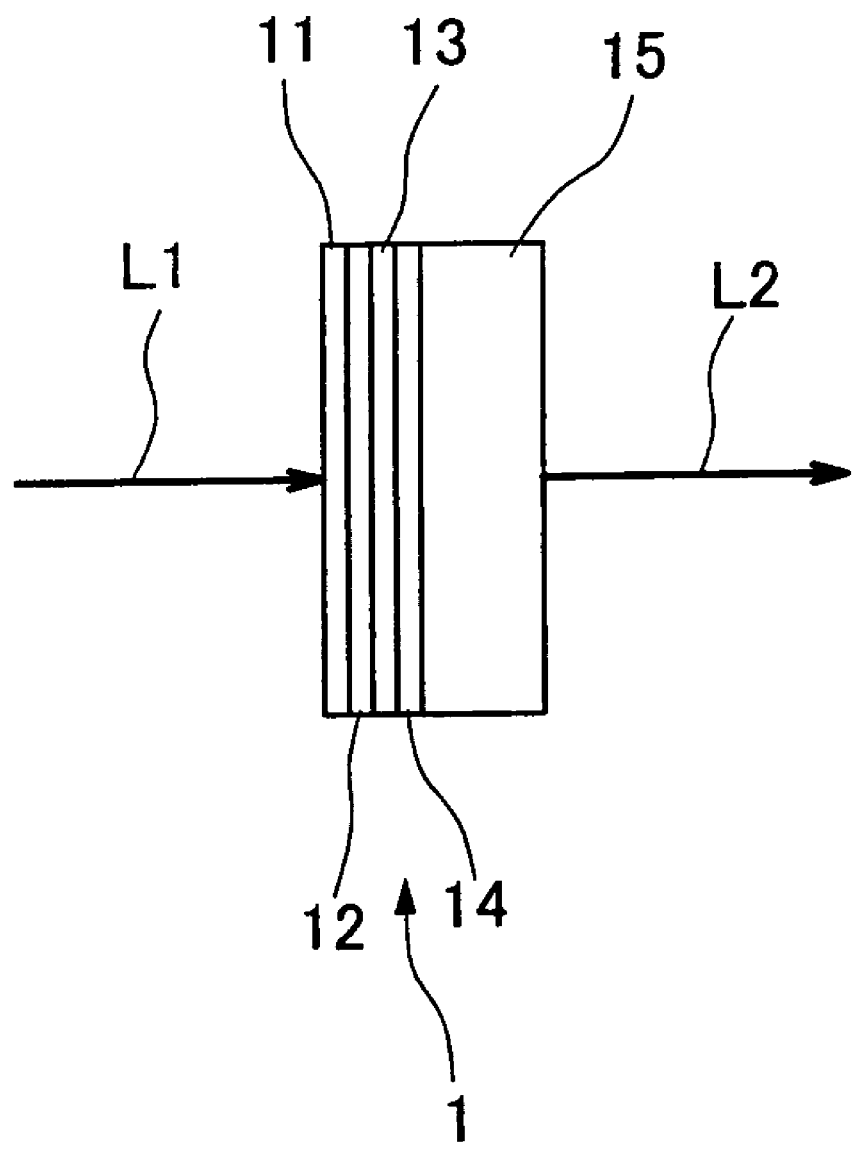
FIG. 1 is a schematic view of a polarization conversion element.

As shown in FIG. 1, a polarization conversion element 1 according to the present invention has a number of phase plates bonded and supported on a substrate plate 15, including, from a light incident side, a first phase plate 11, a second phase plate 12, a third phase plate 13 and a fourth phase plate 14. In this instance, the first and fourth phase plates 11 and 14 are equal with each other in retardation value, while the second and third phase plates 12 and 13 are equal with each other in retardation value. Here, when two phase plates are described as being equal in retardation value, it is most desirable for the two phase plate to be exactly same in retardation value. However, actually slight differences in retardation value would not give rise to any problem in particular. The ratio of retardation value of the first phase plate 11 to the second phase plate 12 is in the range of 1:1 to 1:3. Further, relative to the first phase plate 11, the second phase plate is at the angle of 45 degrees, the third phase plate 13 is at the angle of 90 degrees and the fourth phase plate 14 is at the angle of 45 degrees.

The first to fourth phase plates 11 to 14 are laminated successively on the substrate plate 15, with the above-mentioned azimuthal settings. Each one of the first to fourth phase plates 11 to 14 is formed of a film, and bonded on the substrate plate 15 of optical glass to form a laminated structure which is composed of the first phase plate 11, the second phase plate 12, the third phase plate 13, the fourth phase plate 14 and the substrate plate 15. The substrate plate 15 is not necessarily required in case the four phase plates 11 to 14 are provided as a stand-alone type.

In this instance, used for each one of the above-mentioned phase plates 11 to 14 is an organic thin film which is obtained, for example, by imparting double refraction characteristics to a polymer film such as a film of polycarbonate, polyimide, polyarylate, polyether sulfon, (alicyclic) polyolefin, or poly (metha) acrylate by uniaxial stretching, in such a way as to realize phase differentiating functions.

Further, the respective phase plates are bonded on the substrate plate 15 by the use of an adhesive, for example, by the use of an acryl-base adhesive, an epoxy-base adhesive, a urethane-base adhesive, a polyester-base adhesive, a polyimide-base adhesive, a urea-base adhesive, a melamine-base adhesive, a furane resin-base adhesive, an isocyanate-base adhesive, a silicon-base adhesive, a cellulose-base adhesive, a vinyl acetate-base adhesive, a rubber-base adhesive or a mixture of these adhesives. From the standpoint of easiness, the adhesive is preferred to be a UV-setting type or a thermosetting type but not limited to these types.

The above-mentioned azimuthal settings are angles of horizontal rotations about the center of the first phase plate 11, that is, angular phase shifts of the second to the fourth phase plates which are successively laminated one on another in reference to the optical axis of the first phase plate 11. The above-mentioned retardation value is determined by a product of double refraction index and thickness of the phase plate. Therefore, a desired retardation value can be obtained from various combinations of the double refraction index and thickness of the phase plate.

Incident light L1 to be cast on the polarization conversion element 1 of the above construction may have an arbitrary plane of polarization as long as it is linearly polarized light. However, the incident light L1 may not be linearly polarized light in a strict sense and, for example, may be elliptically polarized light which is in the form of pseudo-linear polarization or which can be regarded as almost linearly polarized light. On the other hand, by transmission through the aforementioned polarization conversion element 1, incident light L1 comes out as output light L2 which is linearly polarized light from an energetic standpoint and one component of which is polarized in a predetermined direction while the other component is polarized in a perpendicularly intersecting direction to produce so-called p-polarized component and s-polarized component. Besides, incident light is split to yield the perpendicularly intersecting polarized components in a ratio of 1:1 in light volume. The polarization conversion elements 1 can produce two perpendicularly intersecting polarized components in an equal ratio over a predetermined wavelength range including a certain reference wavelength. The reference wavelength and the wavelength range to be controlled by the polarization conversion element are determined by retardation values of the respective phase plates.

[Embodiment 1]

Figure 2:
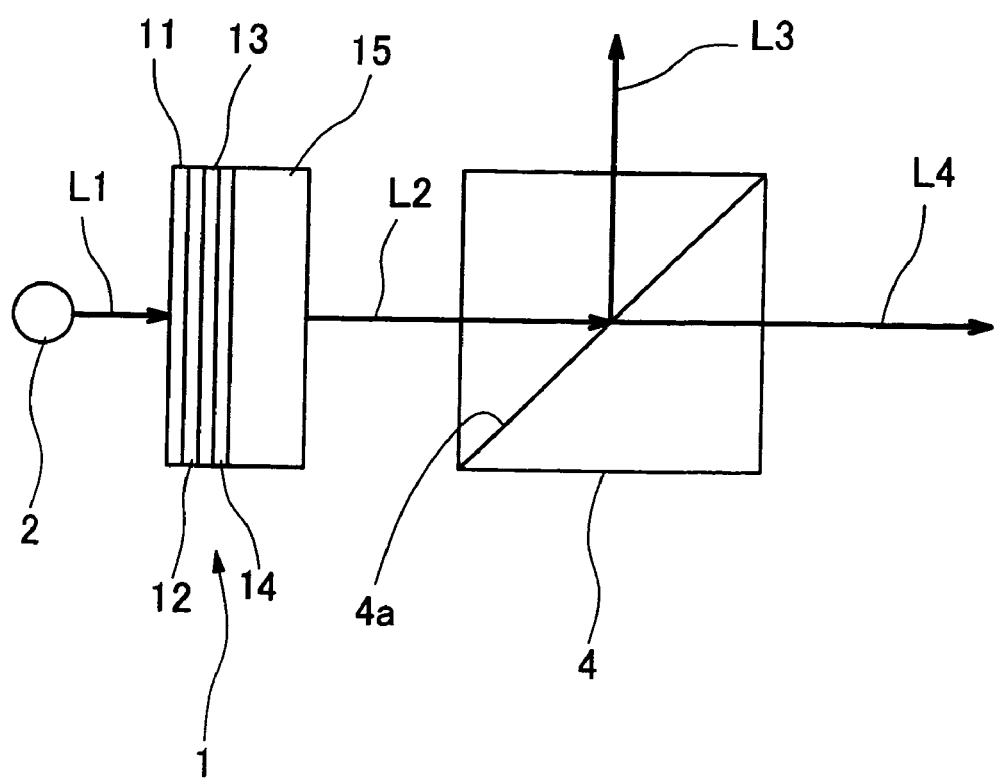
FIG. 2 is a schematic view of an optics arrangement adapted to split white light L1 into reflected light L3 and transmitted light L4.

For example, the polarization conversion element 1, with the above-described functions, can be incorporated into an optical system as shown in FIG. 2. Namely, in that figure, indicated at L1 is a white light beam which is projected from a light source 2. The light beam from the light source 2 is transmitted through the polarization conversion element 1 before entry into a polarizing beam splitter 4.

In this instance, the polarizing beam splitter 4 has a plane of polarization 4a arranged as a complete polarizing beam splitter which is adapted to transmit 100% of one of perpendicularly intersecting components of incident light and to reflect 100% of the other component 100%, for example, to transmit 100% of p-polarized component and to reflect 100% of s-polarized component. Therefore, if incident light is composed of p-polarized component and s-polarized component each in the proportion of 50%, namely, in a ratio of 1:1, the incident light is split in a ratio of 1:1 by the polarizing beam splitter 4.

The light beam from the light source 2 is led to the polarizing beam splitter 4 not directly but by way of the polarization conversion element 1 which is located in a position anterior to the polarizing beam splitter 4. The polarization conversion element 1 functions to produce 50% p-polarized light and 50% s-polarized light on an energetic basis from incident light, which is linearly polarized light having a plane of polarization of an arbitrary angle or from which is regarded as being linearly polarized. Therefore, upon entering the polarization conversion element 1, a beam of white light L1 from the light source 2, which is polarized in an arbitrary direction, is converted by the actions of the phase plates 11 to 14 to produce an output light beam L2 having a p-polarized component and an s-polarized component in a ratio of 1:1 in light volume. As a consequence, by the polarizing beam splitter 4, the output light beam L2 is transmitted and reflected in a ratio of 1:1. The transmitted light beam L4 as well as the reflected light beam L3 from the polarizing beam splitter 4 are polarized uniformly in the same direction.

Figure 3:
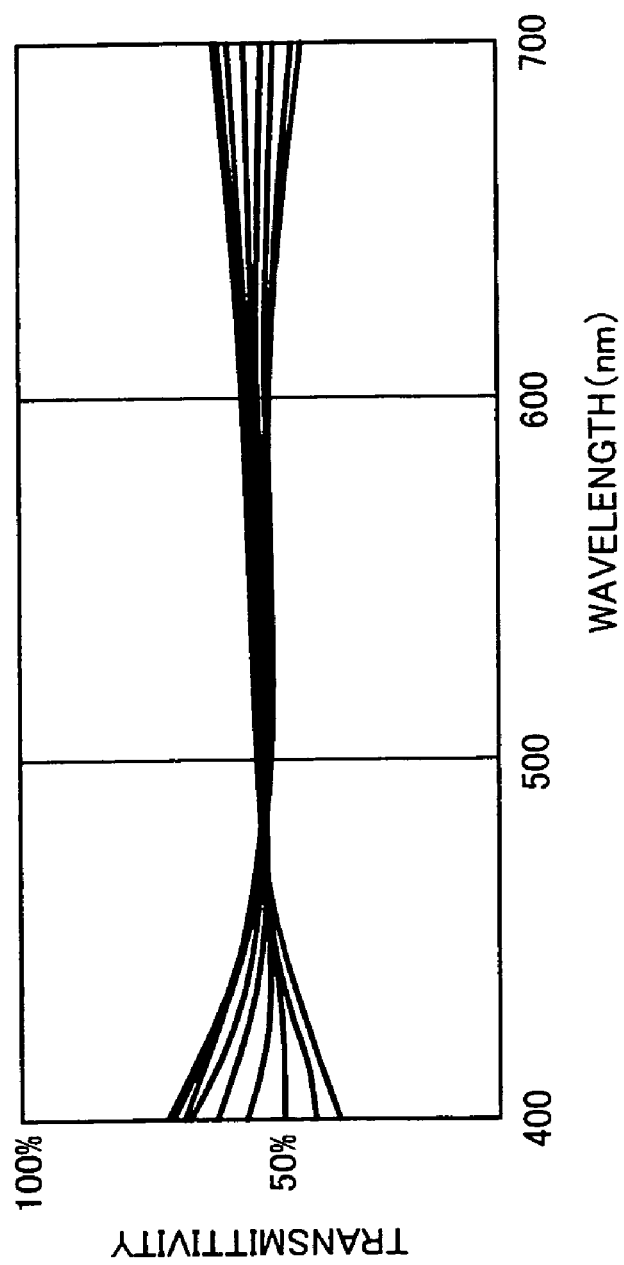
FIG. 3 is a graph plotting proportions of p-polarization component and s-polarization component in outgoing light L2 in Embodiment 1.

Retardation values of the four phase plates 11 to 14 of the polarization conversion element 1 are as follows. First phase plate 11=75 nm, second phase plate 12=115 nm, third phase plate 13=115 nm, and fourth phase plate 14=75 nm. Relative to the first phase plate 11, the second phase plate 12 is set at an angle of 45 degrees, the third phase plate 13 is set at an angle of 90 degrees, and the fourth phase plate 14 is set at an angle of 45 degrees. As a result, as shown in FIG. 3, the ratio of reflected light to transmitted light is 1:1 over the entire range of visible light of 430 nm to 680 nm in wavelength. This means that the combination of the polarization conversion element 1 and the polarizing beam splitter 4 can function substantially as a half mirror in an optical system for splitting incident light in a ratio of 1:1. Besides, the polarization conversion element 1 which is constituted by four phase plates is excellent in weather resistance and can have a long service life, with extremely stabilized light splitting characteristics over a long period of time.

[Embodiment 2]

Figure 4:
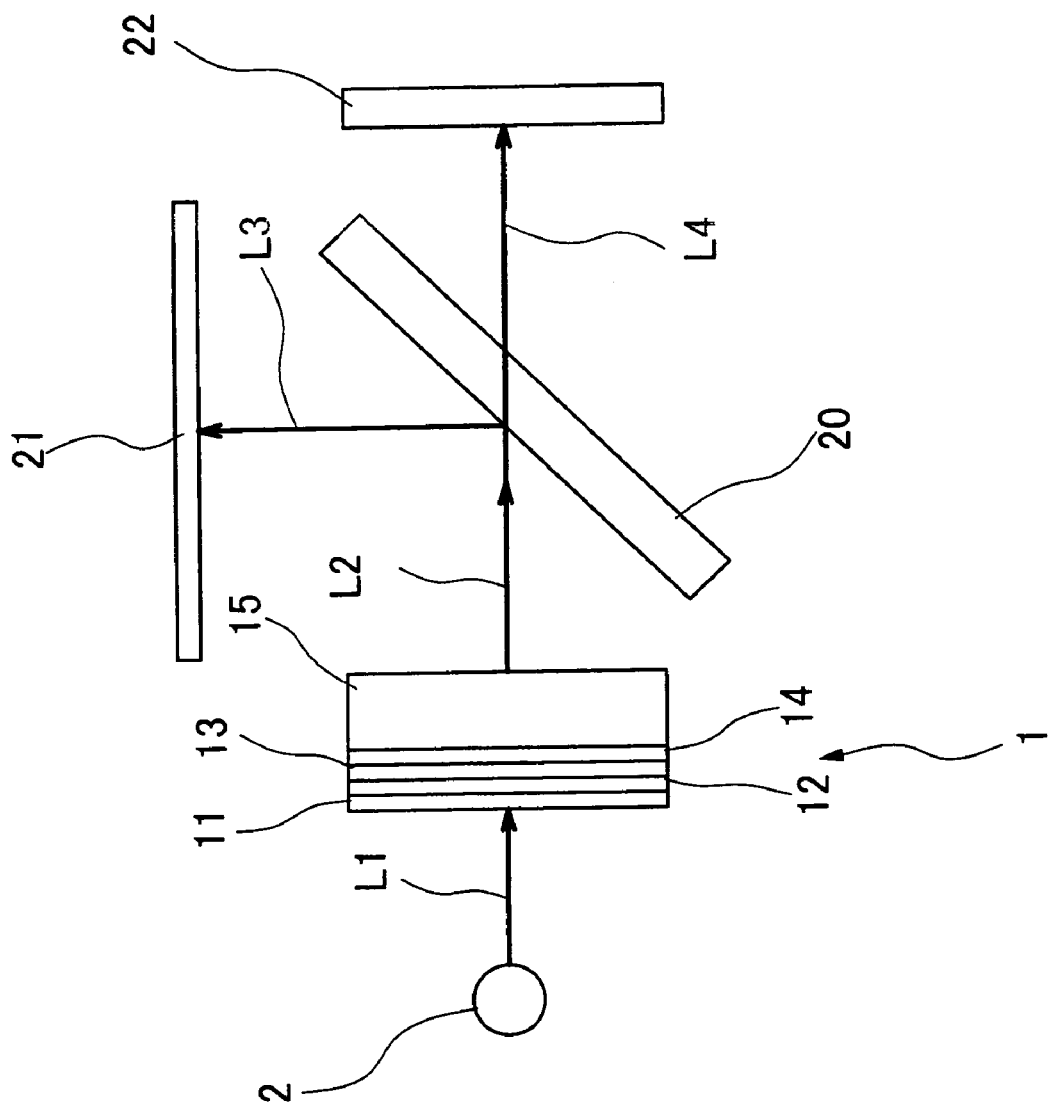
FIG. 4 is a schematic view of an optical disk pickup.

Shown in FIG. 4 is an optical system adopted as Embodiment 2, combining the polarization conversion element 1 with a half mirror 20 (a half mirror as an incomplete polarizing beam splitter) to transmit part of a light beam from a light source. By way of example, the optical arrangement of this embodiment is applied to an optical head device for sampling part of signal light in monitoring fluctuations in light volume of a light source. Namely, this optical system can be suitably applied to APC (Automatic Power Control) for monitoring fluctuations in light volume of a light source.

For APC, the half mirror 20 is arranged in such a way as to reflect off, for example, 90% of a laser beam from a light source 2 by its polarizing films to spot it on a recording surface 21 of an optical disk while transmitting 10% of the laser beam for supply to a light receiving element 22 which functions as a sensor of APC. In the case of a dual optical head for CD and DVD, writing and reading wavelength is 785 nm for CD and 635 nm to 650 nm for DVD. Accordingly, what is required is the stability in splitting the laser beam constantly in a preset ratio by the half mirror 20 across the reading and writing wavelength ranges. Besides, taking into account fluctuations in wavelength under the influence of temperature, it is desirable to guarantee a stable split ratio over a broader range.

In order to control accurately the output power of the laser light source 2 shown in FIG. 4, it is necessary for the light receiving element 22 to receive accurately and constantly a predetermined proportion (10%) of input light, free of fluctuations in split ratio. The polarizing films of the half mirror 20, formed by alternately laminating a low refraction film and a high refraction film, can be set in an arbitrary transmission-reflection ratio by varying film material, film thickness and/or number of films to be laminated.

Figure 5:
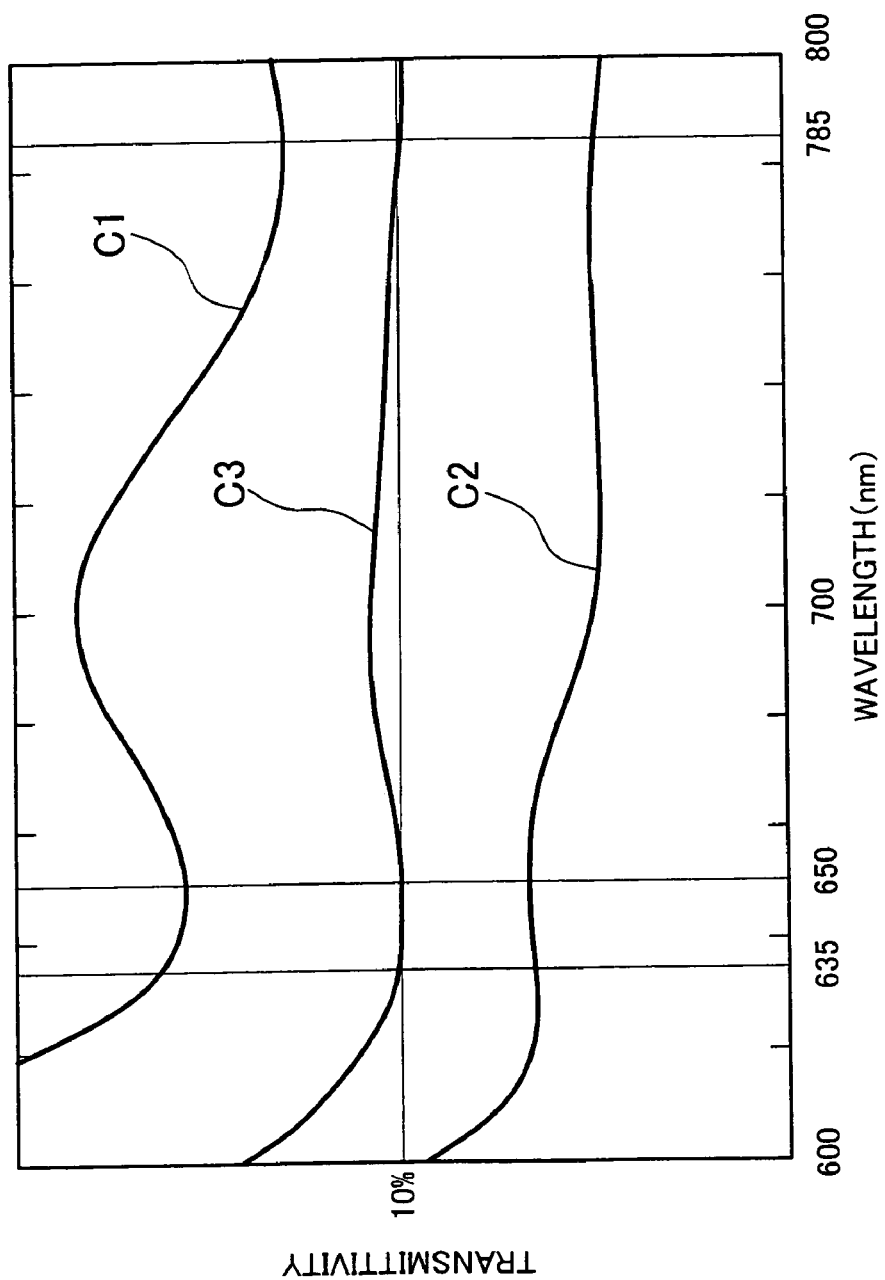
FIG. 5 is a graph plotting transmittivity of a half mirror when incident light on a light receiving element is of 100% p-polarization light, 100% s-polarization light, and 50% p-polarization light and 50% s-polarization light.

Curve C1 in FIG. 5 plots transmittivity of the half mirror 20 when incident light is linearly polarized light and 100% p-polarized light and a semi-transmission film with 10 % transmittivity is used for the half mirror 20. Curve C2 plots transmittivity for incident light which is 100% s-polarized light. Thus, the proportion of input light to be fed to the light receiving element 22 varies unless polarized components of input light are suitably controlled. In contrast, curve C3 plots transmittivity for incident light which contains p- and s-polarized components evenly, that is, each at a rate of 50%. In this case, a predetermined proportion (10%) of input light is accurately sampled not only at CD reading/writing wavelength 785 nm but also at DVD reading/writing wavelength 635 nm to 650 nm.

As shown in FIG. 4, the polarization conversion element 1 is located in a light path between the laser light source 2 and the half mirror 20 thereby to convert input light incident on the half mirror 20 into a polarization controlled beam having rectangularly intersecting polarized components in an even ratio of 1:1. In this manner, by the polarization conversion element 1 which is located on the side of the light source of the half mirror 20, fluctuations in transmission-reflection ratio, arising from wavelength dependency and polarized components in incident light, can be effectively corrected, and constantly 10% of incident light is sampled for APC to control the output power of the laser light source 2 correctly.

More specifically, in order to let the polarization conversion element 1 have the characteristics of C3 in FIG. 5, the retardation values of the first to fourth phase plates 11 to 14 are 105 nm, 160 nm, 160 nm and 105 nm, respectively, and, relative to the first phase plate 11, the second to fourth phase plates are set at the angles of 45 degrees, 90 degrees and 45 degrees, respectively.

[Embodiment 3]

Figure 6:
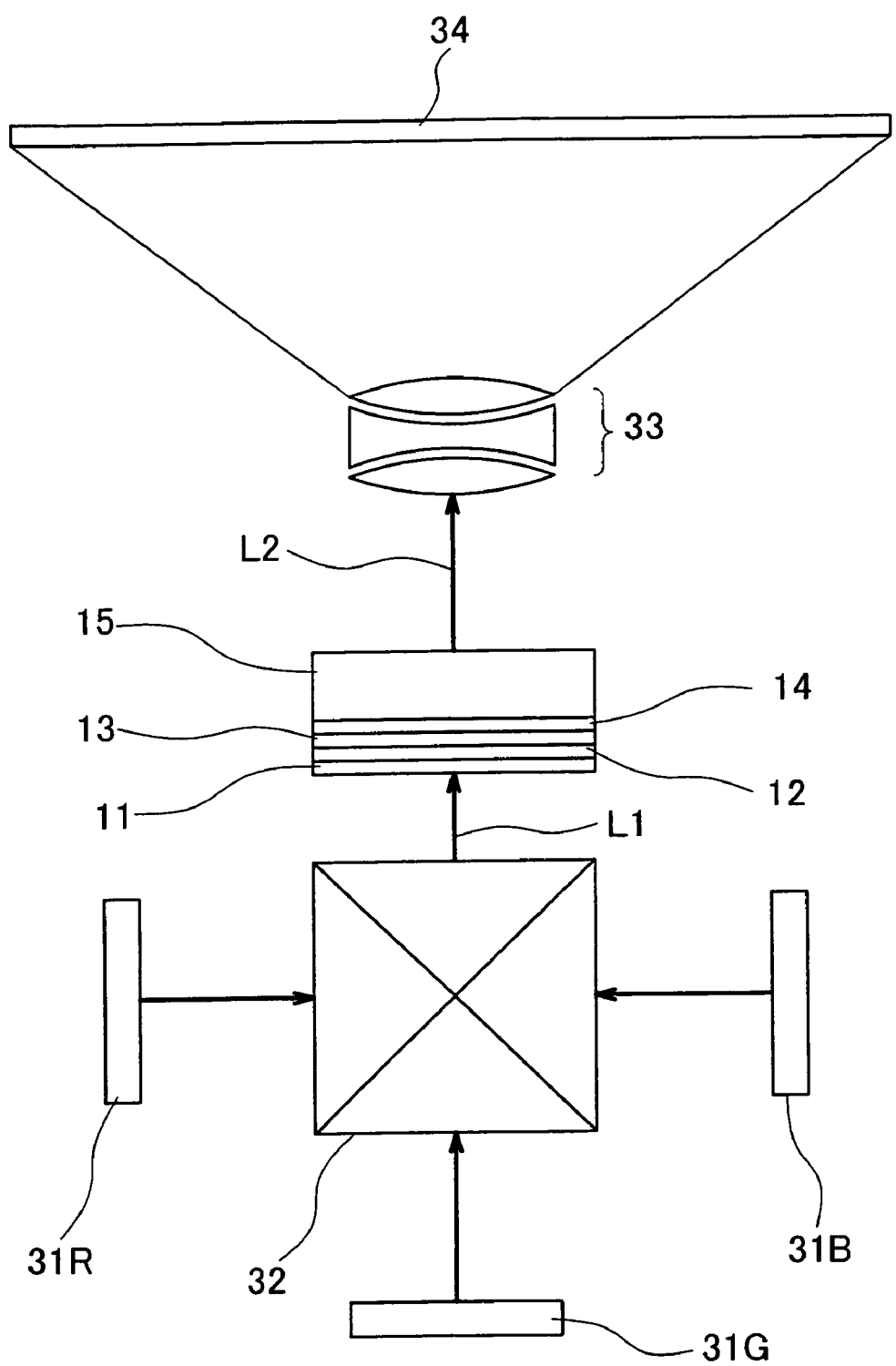
FIG. 6 is a schematic view of a projection type liquid crystal projector.

In the case of the foregoing Embodiment 1, the polarization conversion element 1 is incorporated into an optical system which is arranged to transmit and reflect incident light in a ratio of 1:1. In the case of the foregoing Embodiment 2, the polarization conversion element 1 is applied to a system for splitting a light beam from a light source into predetermined proportions accurately over a wide wavelength range. The polarization conversion element 1 can also be used in a system in which a light beam containing perpendicularly intersecting polarized components in an even ratio of 1:1 is directed reflected off (or transmitted through) an object to suppress fluctuations in volume of reflected (or transmitted) light. For example, as shown in FIG. 6, the polarization conversion element 1 can be applied to a projection type liquid crystal projector as a means for suppressing irregularities in color shading.

In this instance, white light from a light source, not shown, is separated into red, green and blue components by a dichroic mirror which is not shown. These three primary color components are modulated by a red light modulating LC light valve 31R, a green light modulating LC light valve 31G and a blue light modulating LC light valve 31B, respectively, and then synthesized by a cross dichroic prism 32. Synthesized light L1 from the dichroic prism 32 is fed to the polarization conversion element 1 thereby to produce output light L2 having p-polarized component and s-polarized component in a ratio of 1:1 in volume. Output light L2 from the polarization conversion element 1 is projected on a screen 34 in an enlarged size by a projection lens assembly 33.

Due to technical problems in a fabrication process, it is often the case that screen 34 does not have uniform polarization characteristics on its entire surface areas. Namely, the screen 34 may have polarization characteristics of largely reflecting off p-polarized light but scarcely reflecting off s-polarized light in certain localities, and polarization characteristics of largely reflecting off s-polarized light but scarcely reflecting off p-polarized light in other localities. If image light containing p-polarized component and s-polarized component in an uneven ratio is projected on the screen 34 which has different polarization characteristics between different surface areas, the projected image contains irregularities in color shading. For example, if light which contains p-polarized component in a small proportion is projected on a surface area of the screen 34 with polarization characteristics of scarcely reflecting p-polarized light, almost no light is reflected off and irregular color shading takes place on that surface area.

According to the present embodiment, by the polarization conversion element 1, synthesized image light is converted to have p- and s-polarized components in an even ratio of 1:1 in volume. Therefore, the volume ratio of p- and s-polarized components in the projected image light is always controlled at 1:1. If follows that, even on a surface area scarcely reflecting p-polarized component, irregularities in color shading can be suppressed to a minimum by a sufficient amount of reflection of s-polarized component.

Further, according to the present embodiment, the retardation values of the first to fourth phase plates 11 to 14 of the polarization conversion element 1 which is located in a light path to the projection lens assembly 33 are 75 nm, 115 nm, 115 nm and 75 nm, respectively, and, relative to the first phase plate 11, the second to fourth phase plates 12 to 14 are set at the angles of 45 degrees, 90 degrees and 45 degrees, respectively.

Figure 7:
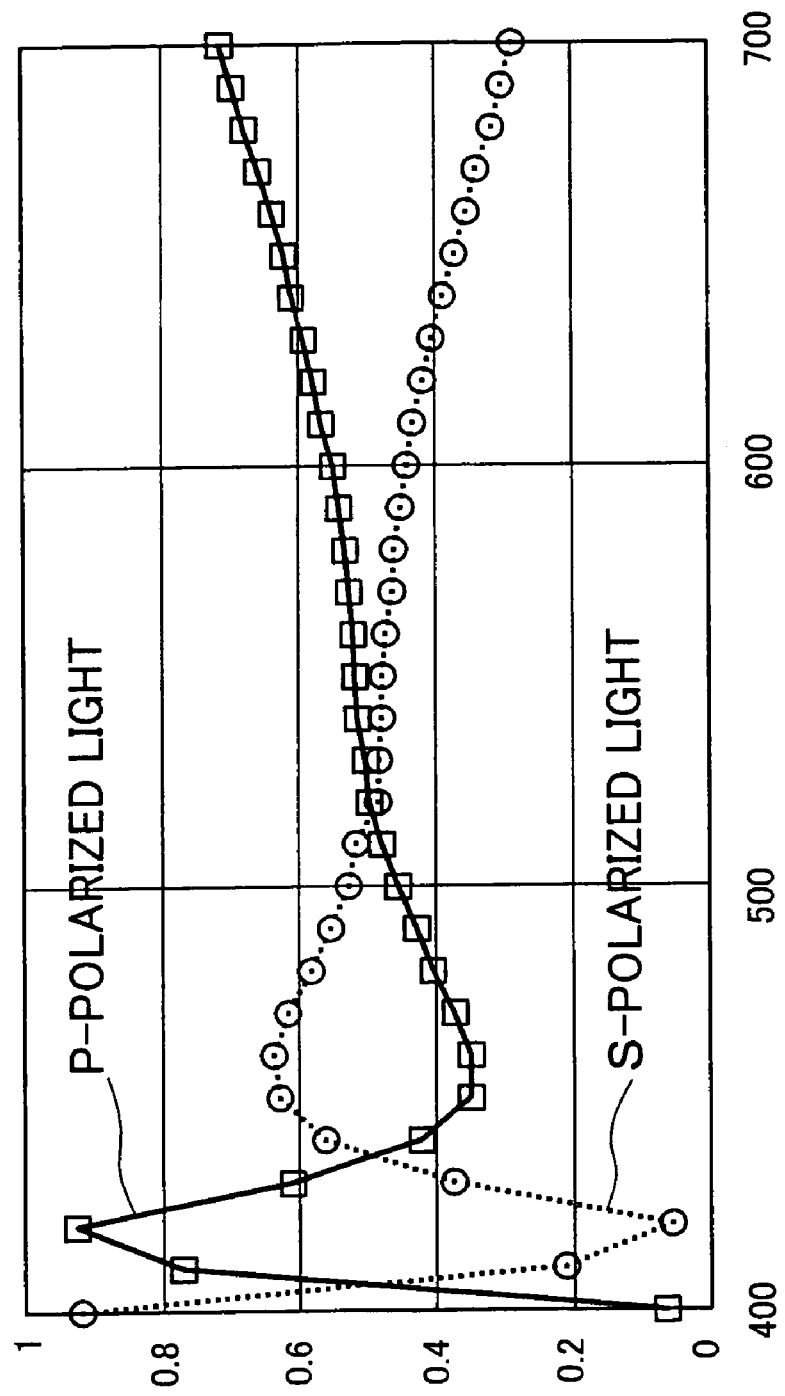
FIG. 7 is a graph showing wavelength profiles of a conventional polarization conversion elements as explained in Embodiment 3, in relation with a relative energy ratio of polarized components on a screen 34.
Figure 8:
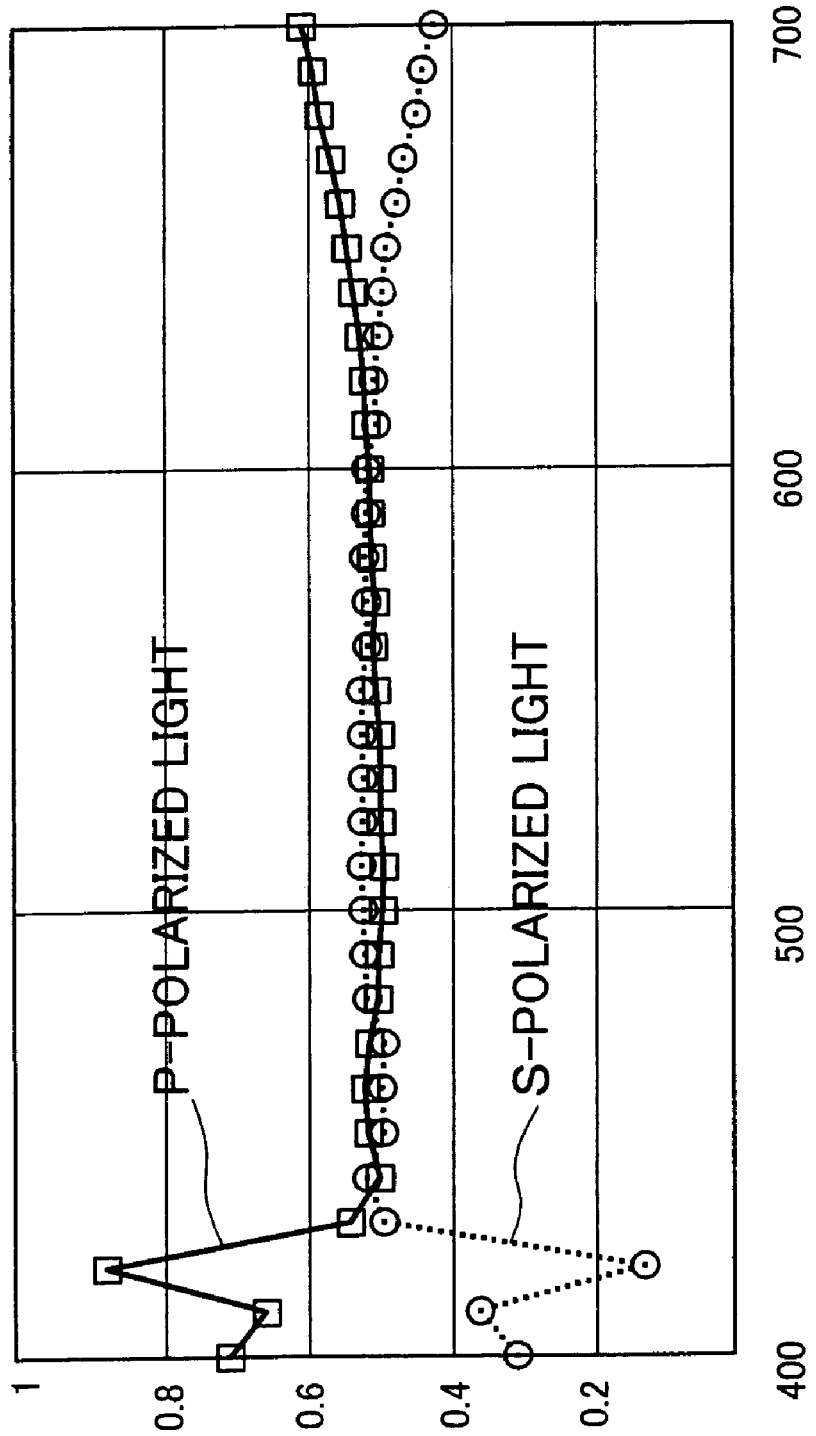
FIG. 8 is a graph showing wavelength profiles of a polarization conversion element according to the present invention, in relation with a relative energy ratio of polarized components on the screen 34.

In this connection, shown in FIG. 7 are results of comparative conversion tests using $\lambda/2$ and $\lambda/4$ polarization conversion elements in place of the polarization conversion element 1. As seen in that figure, the relative energy ratio of p- and s-polarized components is not constant and varies largely in a visible wavelength range of 430 nm to 680 nm. In contrast, as shown in FIG. 8, by using the polarization conversion element 1 of the present invention, a constant relative energy ratio of p- and s-polarized components can be maintained at 50% substantially across the entire visible wavelength range. This means that irregularities in color shading can be suppress even on screen areas with varying reflectivity depending on the direction of polarization of projected light.

Further, laser light in a reference wavelength range of 1450 nm is used in the field of photo-computing. Therefore, the polarization conversion element 1 is required to control p- and s-polarized component in a ratio of 1:1 in volume approximately over the wavelength range of from 1300 nm to 1600 nm. In this case, the retardation values of the first to fourth phase plates 11 to 14 of the polarization conversion element 1 should be 180 nm, 360 nm, 360 nm and 180 nm, respectively.

As explained in the foregoing particular description, the polarization conversion element according to the present invention can produce and output p- and s-polarized components in a volume ratio of 1:1, from incident light having an arbitrary plane of polarization and in the form of linearly polarized light or pseudo-linearly polarized light.

What is claimed is:

1. A polarization conversion element, comprising:
   four laminated phase plates, in the order of first, second, third and fourth phase plates from a light incident side;
   said first and fourth phase plates having substantially the same retardation value while said second and third phase plates having substantially the same retardation value;
   a ratio of a retardation value of said first phase plate to a retardation value of said second phase plate being in the range of 1:1 to 1:3; and
   relative to an optical axis of said first phase plate, said second to fourth phase plates being set at angles of 45 degrees, 90 degrees and 45 degrees, respectively.

2. A polarization conversion element as defined in claim 1, wherein, for conversion of direction of polarization of incident light in a wavelength range of 400 nm to 700 nm, said first to fourth phase plates are arranged to have retardation values 75 nm, 115 nm, 115 nm and 75 nm, respectively.

3. A polarization conversion element as defined in claim 1, wherein, for conversion of direction of polarization of incident light in a wavelength range of 600 nm to 900 nm, said first to fourth phase plate are arranged to have retardation values 105 nm, 160 nm, 160 nm and 105 nm, respectively.

4. A polarization conversion element as defined in claim 1, wherein, for conversion of direction of polarization of incident light in a wavelength range of 1300 nm to 1600 nm, said first to fourth phase plates are arranged to have retardation values 180 nm, 360 nm, 360 nm and 180 nm, respectively.

5. An optical system incorporating a polarization conversion element of claim 1 in a light path anterior to a half mirror for splitting incident light into a predetermined volume ratio.

6. An optical system as defined in claim 5, wherein said half mirror is a polarizing beam splitter adapted to split incident light into p- and s-polarized components.

7. An optical system incorporating a polarization conversion element of claim 1 in a light path to a light reflecting surface having varying reflectivity depending upon polarized components in incident light.

* * * * *